United States Patent [19]

Payrhammer et al.

[11] 4,435,075
[45] Mar. 6, 1984

[54] COLOR COPIER

[75] Inventors: Bernd Payrhammer, Munich; Volker Weinert, Taufkirchen, both of Fed. Rep. of Germany

[73] Assignee: AGFA-Gevaert Aktiengesellschaft, Leverkusen, Fed. Rep. of Germany

[21] Appl. No.: 350,111

[22] Filed: Feb. 18, 1982

[30] Foreign Application Priority Data

Feb. 19, 1981 [DE] Fed. Rep. of Germany ....... 3106124

[51] Int. Cl.³ .................... G03B 27/72; G03B 27/76
[52] U.S. Cl. .................................. 355/35; 350/315
[58] Field of Search .................... 355/32, 35, 36, 37, 355/71, 88; 350/313, 315, 317, 318

[56] References Cited

U.S. PATENT DOCUMENTS

| 3,267,808 | 8/1966 | Czekalla et al. | 350/315 |
| 3,833,295 | 9/1974 | Bebb et al. | 355/36 X |

FOREIGN PATENT DOCUMENTS 2411301  9/1975  Fed. Rep. of Germany .

*Primary Examiner*—Richard A. Wintercorn
*Attorney, Agent, or Firm*—Kontler, Grimes & Battersby

[57] ABSTRACT

A filtering arrangement for adjusting the color composition of the copying light in a color copier has three filters located upstream of an original to be copied as considered in the direction of light propagation. Each filter is divided into three filter sections which are rotatable in unison so as to project into the path of the copying light to larger or smaller degrees. A motor is provided for each filter and each motor has a rotatable drive shaft which is parallel to the path of the copying light. One of the filter sections of each filter is fixedly mounted on the shaft of the corresponding motor for rotation therewith. The remaining two filter sections of each filter are mounted on the shafts of the other motors via roller bearings so as to be rotatable relative to such shafts. The three filter sections of each filter are connected by a cable so that all three filter sections rotate when the motor corresponding to the filter is actuated. By mounting the filter sections of one filter on the drive shafts of the motors for the other filters, the number of pivots required for the filtering arrangement is reduced.

14 Claims, 2 Drawing Figures

COLOR COPIER

BACKGROUND OF THE INVENTION

The invention relates generally to a color copier, especially a photographic color copier.

More particularly, the invention relates to an arrangement for adjusting the color composition of the copying light in a color copier.

The German Auslegeschrift No. 24 11 301 discloses an arrangement for adjusting the color composition of the copying light in a photographic color copier in a stepless or continuous manner. The arrangement includes several color filters which are located one behind the other at a location upstream of an original to be copied as considered in the direction of propagation of the copying light. The filters are movable into the path of the copying light and each of the filters is divided into at least three filter sections which are rotatable towards and away from the center of this path about respective fixed axes. The filter sections of each filter are linked to one another so that they rotate in unison.

The supports for the rotatable filter sections are mounted on a base plate. The base plate also carries the drives for the filter sections and these drives are mounted at locations spaced from the supports.

A disadvantage of the arrangement resides in the large number of supports required for the filter sections. This increases the complexity as well as the cost of the arrangement.

OBJECTS AND SUMMARY OF THE INVENTION

It is an object of the invention to provide a simple arrangement for adjusting the color composition of the copying light in a color copier.

Another object of the invention is to provide an economical arrangement for adjusting the color composition of the copying light in a color copier.

An additional object of the invention is to simplify the above-described arrangement for adjusting the color composition of the copying light in a color copier in a stepless or continuous manner.

The preceding objects, as well as others which will become apparent as the description proceeds, are achieved by the invention.

One aspect of the invention resides in a color copier, particularly a photographic color copier, which is adapted for stepless or continuous changes in the color composition of the copying light. The copier comprises a plurality of overlapping color filters for adjusting the color composition of the copying light. Each of the filters includes a plurality of filter sections and the sections of each filter are rotatable to and from predetermined positions in which these sections project into the path of the copying light. Connecting means is provided for each filter and connects the sections of the same for rotation in unison. The copier further includes drive means for each filter operative to rotate the respective filter sections to and from the aforesaid predetermined positions. Each of the drive means has a rotatable shaft and one of the sections of one of the filters is mounted on the corresponding shaft for rotation therewith. Another section of this filter is mounted on the shaft of another filter and is rotatable relative to such shaft.

By mounting a filter section of one filter on the drive shaft for another filter, the number of axes of rotation, and hence the number of supports required for the filter sections, may be substantially reduced. For example, if the copier has three filters and each of the filters has three sections, only the three shafts corresponding to the three filters are necessary to mount the filter sections.

According to a preferred embodiment of the invention, the rotatable shafts are the drive shafts of the motors which are used to rotate the filter sections.

A filter section is favorably mounted on the drive shaft of another filter via a roller bearing in order to insure that the filter section is rotatable relative to the shaft.

Advantageously, each of the filters is divided into at least three filter sections.

The filters are preferably located upstream of an original to be copied as considered in the direction of propagation of the copying light.

The novel features which are considered as characteristic of the invention are set forth in particular in the appended claims. The improved copier itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
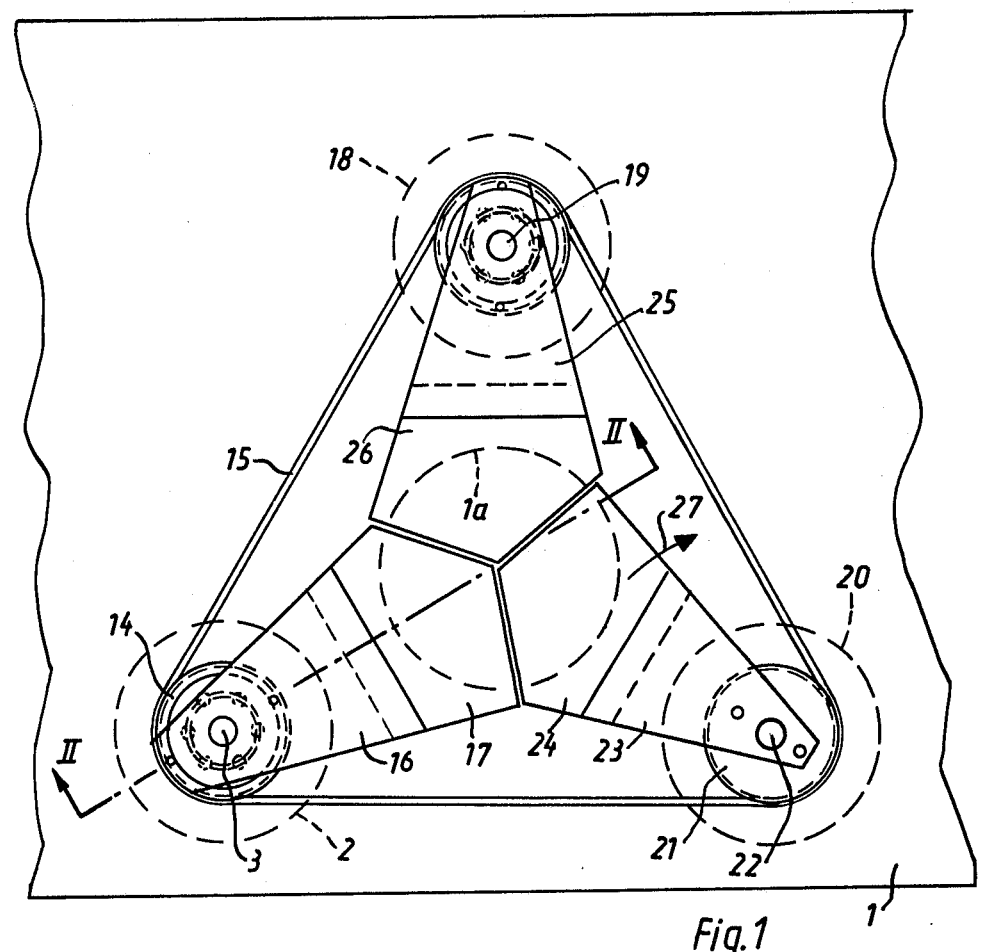
FIG. 1 is a plan view of an arrangement in accordance with the invention for adjusting the color composition of the copying light in a color copier.

FIG. 1 illustrates an arrangement which is located internally of a color copier, e.g. a photographic color copier, and is operative to adjust the color composition of the copying light. The arrangement is located upstream of an original to be copied as considered in the direction of propagation of the copying light.

The arrangement includes a base plate 1 having a central opening 1a for passage of the copying light. In accordance with the teachings of the German Auslegeschrift No. 24 11 301, three subtractive color filters, e.g. purple, cyan and yellow filters, are arranged above the opening 1a. The color filters are located in three different planes and are superimposed with one another. Each of the color filters is divided into a plurality of filter sections. In the illustrated embodiment, the three color filters are each divided into three filter sections. Only the uppermost color filter is shown in FIG. 1 and it may be seen that this color filter is composed of the filter sections 17, 24 and 26. The filter sections 17, 24 and 26 are secured, e.g. adhesively, to respective carriers 16, 23 and 25. The carriers 16, 23 and 25 may, for example, be composed of sheet material such as sheet metal.

In the position illustrated in FIG. 1, the filter sections 17, 24 and 26, as well as the two other sets of filter sections, cover the opening 1a. It may be seen that virtually no gaps exist between adjacent ones of the filter sections 17, 24 and 26 in this position. The same holds true for the two other sets of filter sections.

Figure 2:
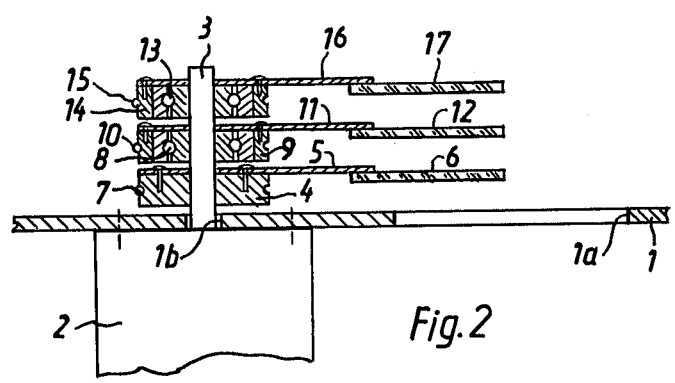
FIG. 2 is a sectional view in the direction of the arrows II—II of FIG. 1.

Referring to FIG. 2 in conjunction with FIG. 1, it may be seen that the base plate 1 is provided with three additional openings 1b. The openings 1b are located at the corners of an equilateral triangle and are symmetrically arranged with respect to the opening 1a. Three motors 2, 18 and 20 are secured, e.g. screwed, to the lower surface of the base plate 1 in the regions of the openings 1b. The motors 2, 18 and 20 have respective rotatable drive shafts 3, 19 and 22 which extend through the openings 1b and project upwards of the base plate 1. Each of the motors 2, 18 and 20 drives the filter sections of one of the color filters in rotation between the positions shown in FIG. 1 and positions in which the filter sections cover the opening 1a to a lesser degree.

It is assumed here that the motor 2 drives the filter sections for the lowermost filter, the motor 18 drives the filter sections for the middle filter and the motor 20 drives the filter sections 17, 24 and 26 for the uppermost filter. The filter sections for the lowermost filter are represented by the reference numeral 6 and are mounted on sheet-like carriers 5. Similarly, the filter sections for the middle filter are represented by the reference numeral 12 and are mounted on sheet-like carriers 11.

A sheave 21 is secured to, e.g. press fitted on, the shaft 22 of the motor 20 which drives the filter sections 17, 24 and 26 of the uppermost filter. In other words, the sheave 21 is mounted for rotation with the shaft 22. The sheave 21 has a groove which receives a cable 15. The carrier 23 for the filter section 24 of the uppermost filter is fixed to the sheave 21, e.g. via threaded connectors.

As best seen in FIG. 2, the carrier 16 for the filter section 17 of the uppermost filter is fixedly connected with a ring 14, e.g. by means of threaded connectors or adhesively. The ring 14 is mounted on, e.g. press fitted on to, the outer race of a roller bearing 13. The inner race of the roller bearing 13 is, in turn, fixed to the shaft 3 of the motor 2 which drives the filter sections 6 of the lowermost filter. Accordingly, the carrier 16 for the filter section 17 of the uppermost filter can rotate freely relative to the shaft 3 via the roller bearing 13.

The ring 14 has a peripheral groove which receives the cable 15. Thus, the carrier 16 for the filter section 17 of the uppermost filter is kinematically connected with the sheave 21 which is mounted on the shaft 22 of the motor 20 and is driven in rotation by the latter.

The carrier 25 for the filter section 26 of the uppermost filter is mounted on the shaft 19 of the motor 18 which drives the middle filter. The carrier 25 is mounted on the shaft 19 in the same manner as the carrier 16 is mounted on the shaft 3 so that the carrier 25 is freely rotatable relative to the shaft 19. Furthermore, the carrier 25 for the filter section 26 is kinematically connected with the sheave 21 on the motor 20 via the cable 15 as described for the carrier 16.

When the motor 20 is operated to rotate the shaft 22 in the direction of the arrow 27 shown in FIG. 1, the uppermost filter section 24 is caused to rotate in this direction. Since the uppermost filter section 24 is kinematically connected with the uppermost filter sections 17 and 26 via the cable 15, the uppermost filter sections 17 and 26 then rotate in the same direction and by the same amount as the uppermost filter section 24.

As seen in FIG. 2, one of the carriers 5 for the filter sections 6 of the lowermost filter is secured to, e.g. screwed onto, a sheave 4 having a groove which receives a cable 7. The sheave 4 is mounted on, e.g. press fitted onto, the drive shaft 3 of the motor 2 which drives the lowermost filter, that is, the sheave 4 is mounted for rotation with the shaft 3. The remaining two filter sections 6 of the lowermost filter are respectively mounted on the shafts 19 and 22 of the motors 18 and 20 which drive the middle and uppermost filters. The manner in which the remaining filter sections 6 are mounted on the shafts 19 and 22 is the same as that described for the filter sections 17 and 26 of the uppermost filter. In other words, these remaining filter sections 6 are rotatable relative to the shafts 19 and 22. The cable 7 kinematically connects the filter sections 6 mounted on the shafts 19 and 22 with the filter sections 6 secured to the shaft 3 of the motor 2 which drives the lowermost filter.

One of the filter sections 12 of the middle filter is mounted for rotation with the drive shaft 19 of the motor 18 which drives the middle filter. This is achieved by securing the corresponding carrier 11 to a sheave such as the sheave 4 or 21 which is fixedly connected with the shaft 19. The remaining two filter sections 12 of the middle filter are respectively mounted on the shafts 3 and 22 of the motors 2 and 20 which drive the lowermost and uppermost filters. As illustrated in FIG. 2, the remaining filter sections 12 of the middle filter are rotatable relative to the shafts 3 and 22. Thus, the carrier 11 for each of these filter sections 12 is secured to a ring 9, e.g. via threaded connectors. The ring 9 is mounted on, e.g. press fitted onto, the outer race of a roller bearing 8. The inner race of the roller bearing 8 is, in turn, fixedly connected with the respective shaft 3 or 22.

Each of the rings 9 has a groove which receives a cable 10. The cable 10 kinematically connects the filter sections 12 mounted on the shafts 3 and 22 with the filter section 12 secured to the shaft 19 of the motor 18 which drives the middle filter.

It will be noted that the drive shafts 3, 19 and 22 constitute fixed axes of rotation for the filter sections 6, 12, 17, 24 and 26.

Non-illustrated, adjustable stops may be mounted on the base plate 1 and arranged to cooperate with projections provided at least on the sheaves such as the sheaves 4 and 21 which are fixedly connected with the drive shafts 3, 19 and 22. In this manner, movement of the filter sections 6, 12, 17, 24 and 26 may be restricted so that the filter sections of the respective filters will not collide with one another.

The filtering arrangement may be used in various ways depending on the manner in which the motors 2, 18 and 20 are controlled. One possibility is to use the filters only to adjust the color composition of the copying light but not to terminate the exposures in the respective colors. To this end, it is sufficient to adjust the positions of the three filters in such a manner each time before the production of copies is begun that the exposure times for the different colors are approximately equal for an original, e.g. a negative, having an average color composition.

It is further possible to use the filters both to adjust the color composition of the copying light and to terminate the exposures in the respective colors. Here, the motors 2, 18 and 20 and the corresponding filters are adjusted at the beginning of each copying operation so that predetermined gaps exist over the opening 1a between the filter sections of the respective filters. The gaps are selected in such a manner that the color composition of the copying light transmitted through the gaps results in equal exposure times for the different colors when an original, e.g. a negative, having an average color composition is copied. During copying of an original, the amounts of light in the colors corresponding to the filters are measured. If, for some reason, e.g. because the original being copied does not have an average color composition, the measurements indicate that the exposure in a particular color is to be terminated at a different time than the exposures in the other colors, the motor for the filter corresponding to this color is actuated at such time as the exposure is to be terminated. The motor, and hence the associated drive shaft, are rotated in a sense opposite to that indicated by the arrow 27 to thereby cause the filter sections of the respective filter to completely cover the opening 1a as rapidly as possible. This procedure is repeated when the exposures in the two colors corresponding to the remaining filters are to be terminated. Once the exposures in the three colors corresponding to the three filters have been completed, a shutter may be moved into the path of the copying light. The shutter prevents light having wavelengths which are transmitted by the filters, as well as light passing through any gaps which remain between the filter sections of the respective filters, from reaching the copying material. This is especially important when the copier is not in operation for extended periods of time. Prior to the next exposure, the filter sections of the respective filters are again moved away from one another to previously determined positions, e.g. positions which are appropriate for the particular type of copying material being used.

In another mode of operation with the filtering arrangement, measurements of each of the three colors corresponding to the filters are performed on an original, e.g. a negative, to be copied prior to exposure. The amount of light to which the original must be exposed in each of the three colors is then determined. The motors 2, 18 and 20 are subsequently activated to bring the filter sections of the respective filters into predetermined positions. These positions are selected in such a manner that the color composition of the copying light transmitted through the filters results in equal exposure times for the three colors. The exposure is begun by opening a shutter and is terminated in the same manner. When another original is to be copied, the filters are again individually adjusted in dependence upon the color composition of this original.

Each of the filters may be composed of four or more rather than three filter sections. The base plate 1 is provided with a fixed pivot for each additional filter section beyond three. The additional filter sections are mounted on the respective pivots in such a manner as to be rotatable relative thereto, that is, the additional filter sections are mounted on the respective pivots in a manner similar to that illustrated in FIG. 2 for the filter sections 12 and 17 of the middle and uppermost filters. The additional filter sections may be driven via cables such as the cables 7, 10 and 15 shown in FIG. 2. Instead of cables, it is possible to use toothed belts or other coupling elements.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A color copier, particularly a photographic color copier, comprising:
    (a) a plurality of overlapping color filters for adjusting the color composition of the copying light, each of said filters including a plurality of filter sections, and the sections of each filter being rotatable to and from predetermined positions in which said sections project into the path of the copying light;
    (b) connecting means for each filter connecting the sections thereof for rotation in unison; and
    (c) drive means for each filter operative to rotate said sections to and from said predetermined positions, each of said drive means including a rotatable shaft, and one of the sections of one of said filters being mounted on the corresponding shaft for rotation therewith, said one filter having another section which is mounted on the shaft of another filter and is rotatable relative to such shaft.

2. A copier as defined in claim 1, wherein each of said drive means includes a motor for driving the respective shaft in rotation.

3. A copier as defined in claim 1, wherein said filters are located upstream of an original to be copied as considered in the direction of propagation of the copying light.

4. A copier as defined in claim 1, wherein each of said sections is rotatable about a fixed axis.

5. A copier as defined in claim 1, wherein each of said filters has at least three sections.

6. A copier as defined in claim 1, wherein each filter has one section which is mounted on the corresponding shaft for rotation therewith, the remaining sections of each filter being respectively mounted on the shafts of the other filters and being rotatable relative to such shafts.

7. A copier as defined in claim 1, comprising three filters and three drive means; and wherein each of said filters is composed of three sections.

8. A copier as defined in claim 1, wherein said filters have different colors.

9. A copier as defined in claim 1, wherein said connecting means comprise grooved members, and cable-like elements engaging said members.

10. A copier as defined in claim 1, comprising a bearing on said shaft of said other filter; and wherein said other section is mounted on said bearing.

11. A copier as defined in claim 10, said bearing having an external peripheral portion; and wherein the connecting means for said one filter comprises a member mounted on said peripheral portion.

12. A copier as defined in claim 11, said member having a groove; and wherein said connecting means for said one filter comprises a cable-like element which is received in said groove.

13. A copier as defined in claim 11, wherein said peripheral portion is an outer race of said bearing.

14. A copier as defined in claim 10, wherein said bearing is a roller bearing.

* * * * *